March 2, 1937. G. E. ROWE 2,072,827
METHOD OF AND APPARATUS FOR FEEDING MOLTEN GLASS
Filed Aug. 18, 1934
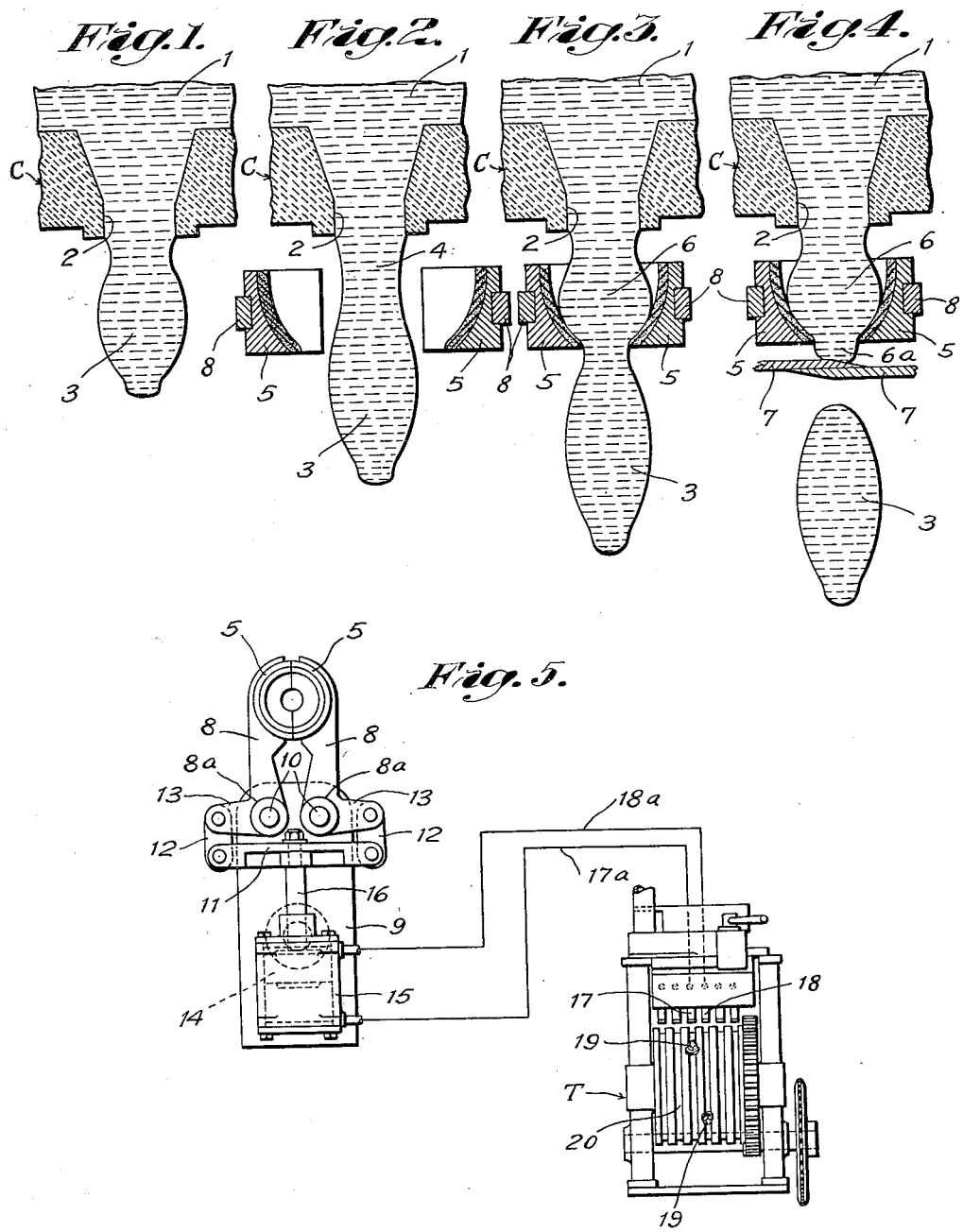

Patented Mar. 2, 1937

2,072,827

UNITED STATES PATENT OFFICE 2,072,827

METHOD OF AND APPARATUS FOR FEEDING MOLTEN GLASS

George E. Rowe, Wethersfield, Conn., assignor to Hartford-Empire Company, Hartford, Conn., a corporation of Delaware Application August 18, 1934, Serial No. 740,418

5 Claims. (Cl. 49—55)

This invention relates to improvements in methods of feeding molten glass in mold charges, and it consists in the combinations, constructions and arrangements and in the steps hereinafter set forth.

An object of the invention is to obtain preshaped mold charges from glass that has issued from a downwardly opening outlet of a glass feeding container without the necessity of effecting periodic variations in the rate of flow or direction of movement of the glass at the outlet either to aid in pre-shaping each accumulating mold charge mass or to prevent the glass above a severing plane from piling up on shears by which each mold charge obtained is severed from glass of the succeeding mold charge mass.

A further object of the invention is to provide a novel method of effecting desirable constriction or necking of an intermediate portion of each of successive pendant masses or columns of glass below the feed outlet of a glass feeding container preliminary to the closing of shear blades to cut through the constricted or necked-in portion of such pendant mass or column.

Other objects and advantages of the invention will hereinafter be pointed out, or will become apparent from the following description of a typical series of steps of the method of the invention and of apparatus for use in carrying out the method, such steps and apparatus being illustrated in the accompanying drawing, in which:

Figure 1 is a fragmentary vertical sectional view showing glass of a supply body issuing from a submerged discharge outlet of a glass feeding container to augment a suspended mold charge mass, the shape of which has been controlled by steps which are illustrated in subsequent views of the drawing;

Fig. 2 is a view similar to Fig. 1 but showing the suspended mold charge mass at a further stage in its formation and showing also the separated sections of an open-bottomed shaping cup that is adapted for use in the performance of certain steps of the method of the present invention;

Fig. 3 is a view similar to the preceding views but showing the suspended mold charge mass at a still further stage in its production, the glass between the suspended mold charge mass and the accumulating succeeding mold charge mass having been constricted or "necked-in" by the closing of the sections of the shaping cup;

Fig. 4 is a view similar to the preceding views but showing the pre-shaped mold charge after it has been separated from the succeeding mold charge mass by the closing of shear blades and showing also the manner in which the closed shaping cup imparts a desired shape to the accumulating succeeding mold charge mass and prevents glass of such mass from piling up on the shears by which the preceding mold charge has been severed; and Fig. 5 is a fragmentary more or less diagrammatic plan view of mechanism suitable for opening and closing the sections of the charge shaping cup at predetermined variable intervals of time.

In carrying out the invention, I provide a supply body of glass 1, Figs. 1 to 4 inclusive, in position to submerge a discharge outlet 2 in the bottom of a glass feeding container C. Such container, only a fragmentary portion of the bottom wall of which is shown, may be the outer or delivery end of a glass feeding forehearth of any suitable or preferred construction or may be any other suitable known glass feeding container.

The supply body of glass over the outlet 2 may have sufficient head pressure and be maintained at a suitable temperature and in a suitable condition of viscosity to provide for discharge from the outlet of a pendant column of glass that will remain in suspension below the outlet until the lower end thereof has descended a substantial distance below the outlet. Any suitable known means may be provided for controlling the temperature and viscosity of the supply body of glass and of the head of glass over the outlet.

As shown in Fig. 1, mold charge mass 3 is in suspension below the discharge outlet and is being augmented by glass issuing from the outlet. The lower end and adjacent portion of this mold charge mass have been shaped in a manner which will be understood from the following description of typical operations involved in the production and severance of a pre-shaped complete mold charge and the shaping and control of the residual and oncoming glass to provide a further or succeeding suspended mold charge mass.

As shown in Fig. 2, the mold charge mass 3 is still in suspension below the outlet 2 but has moved downwardly to a lower level and is connected with the glass at the outlet by a suspending column of glass 4. The column of glass 4 may have a diameter approximating that of the outlet, or in other words, be substantially cylindrical. If the glass of the mold charge mass 3 has exerted a sufficient pull thereon, a portion of the column 4 may have been pulled in to a diameter slightly less than that of the outlet.

The sections 5 of an open-bottomed shaping cup are disposed at opposite sides of or spaced angularly around the axis of the pendant column of glass and depending mold charge mass. The particular cup shown has two sections, each constituting a half portion thereof. Each of such sections may be lined with a material, such as graphite, which may be heated to a relatively high temperature without molten glass adhering thereto.

In Fig. 3, the sections 5 of the open bottomed shaping cup have been closed and the glass at the juncture of the upper end portion of the mold charge mass 3 with its suspending column has been constricted or "necked-in" by the contact therewith of the lower edges of the sections of the shaping cup and by the pull of the mass 3 on the glass at and immediately below the bottom opening of the shaping cup. The walls of the lower end of the closed cup have taken over from the outlet 2 the function of supporting in suspension the mold charge 3. The portion of the aforesaid suspending column above the bottom opening of the shaping cup is being enlarged by oncoming glass and, as it enlarges, is laterally supported and pre-shaped by the shaping cup to form a further mold charge mass, designated 6.

At the stage of operations illustrated in Fig. 4, shear blades 7 have been closed to cut through the constricted or necked-in portion of glass connecting the upper end portion of the charge mass 3 with the succeeding mold charge mass 6. The mold charge mass 3 is falling as a pre-shaped separated entity. The mold charge mass 6 is supported within the closed cup, except for the narrow tip thereof, indicated at 6a, which depends through the opening at the bottom of the shaping cup. This tip 6a will be chilled at its extremity by the shears and will be sufficiently supported from above to prevent any harmful piling up of glass on the closed shear blades 7. The shear blades 7 may be operated by any suitable known mechanism, preferably such as will open them quickly after the severing operation has been completed.

The sections 5 of the shaping cup may be opened as soon as the severing operation has been completed and the shear blades have been opened or are opening. The pendant glass mass 6—6a will then be supported in suspension from the outlet 2, substantially as shown for the mold charge mass 3 in Fig. 1.

Operations such as have been described may be repeated in cyclic order for the production of a series of similar preshaped charges.

The times of closing and opening of the halves of the shaping cup may be selected for most advantageous use in view of the particular conditions existing at any given time. Any suitable mechanism may be employed for opening and closing the sections of the cup at instants which may be predetermined and varied within a considerable range of time. One mechanism suitable for this purpose is shown more or less diagrammatically in Fig. 5. By referring to that view, it will be noted that the sections 5 of the shaping cup are carried by a pair of cooperative pivoted lever arms 8 of bell cranks 8a. The bell cranks 8a are supported on a suitable bracket or supporting plate 9 and are connected with the latter by vertical pivot pins 10. The arms 8 may be swung toward and away from each other by the use of a reciprocating cross-head 11 which is connected by links 12 with out-turned arms 13 of the bell cranks 8a. The reciprocatory movements of the cross-head 11 may be occasioned by a pneumatic device, comprising a piston 14 working in a cylinder 15 and connected with the cross-head 11 by a piston rod 16. The reciprocations of the piston 14 in the cylinder 15 may be controlled by a timer T having valves 17 and 18 respectively connected by air lines 17a and 18a with the opposite ends of the cylinder 15. Adjustable actuators 19 on a rotating drum 20 of the timer T are provided for operating the valves 17 and 18 at times which may be varied at will so that the times of application and exhaust of pressure fluid to and from each of the opposite ends of the cylinder 15 may be predetermined and varied at will. The timer T is of the type known in the art as the "Hartford I. S. Timer" and therefore requires no further description. It may be noted, however, that such timer or any other suitable known timer may be employed to control the operations of the shaping cup in timed relation with the opening and closing movements of the shears and with the operations of any other working parts of associate glass machinery.

The shape of the interior of the shaping cup, the size of the bottom opening thereof, the number of sections of which the cup is composed, and various features of construction and operation of the cup may be predetermined and selected in view of different requirements at different times, all within the scope of the invention. The invention is not to be limited beyond the terms of the appended claims.

I claim:

1. The method of feeding molten glass in mold charges which comprises, causing glass to issue downwardly from a discharge outlet to form a columnar mass in suspension below the outlet, positively constricting a portion of said suspended mass at a plane located below said outlet and at a distance above the level of the lower end of the suspended mass not substantially less than the length of the mold charge desired, and severing said charge from the suspended mass at a plane below said plane of constriction of a portion of said mass.

2. The method of feeding molten glass in mold charges which comprises, superimposing a supply body of molten glass on a discharge outlet to cause glass of the supply body on issuance from the outlet to form a mass of substantial cross section in suspension from the outlet, positively constricting a portion of said suspended mass of glass by closing the sections of a sectional constricting device about the suspended glass mass at a plane below the outlet and above the level of the lower end of the suspended mass a distance not substantially less than the length of the mold charge desired, and severing said mold charge from said suspended mass at a plane below the place of application of said constricting device to said mass and while said constricting device is maintained in contact with said mass.

3. The method of feeding molten glass in mold charges which comprises, causing molten glass to pass downwardly from a supply body through a discharge outlet and to accumulate below the discharge outlet in a suspended mass containing more than enough glass for the mold charge desired, constricting a portion of the suspended mass at a plane below the outlet and above the lower end of the suspended mass a distance not substantially less than the length of the mold charge desired and laterally supporting the portion of the mass above the constricted portion to aid in imparting a predetermined shape to the succeeding mold charge mass, and severing a mold charge by cutting through the mass below and adjacent to said place of constriction of said portion of said mass.

4. The method of feeding molten glass in mold charges which comprises, causing molten glass to issue from a supply body downwardly through a discharge outlet to form a hanging mass having a length substantially greater than its diameter, positively constricting a portion of said hanging mass at a plane below the outlet and above the level of the lower end of the suspended mass a distance not substantially less than the length of the mold charge desired, by applying thereto the sections of an annular sectional constricting device, maintaining said constricting device in contact with said glass mass for sufficient time to permit the glass immediately below said constricting device to attenuate slightly by the pull thereon of the underlying glass, and severing said mold charge by cutting through said attenuated portion of glass at a plane below and adjacent to said glass constricting device and while the glass below said constricting device is in suspension therefrom.

5. The method of feeding molten glass in mold charges which comprises, causing molten glass to pass downwardly from a supply body through a discharge outlet so as to accumulate in suspension below the outlet in a mass having a length substantially greater than its diameter, closing the sections of an open-bottomed sectional glass constricting and shaping cup about an intermediate portion of said suspended mass to constrict said intermediate portion of the mass at a distance from the lower end thereof not substantially less than the length of the mold charge desired and to support the glass between said constricted portion of the mass and said outlet, cutting off said mold charge from said mass by closing shear blades to cut through the glass below and adjacent to the bottom of said closed constricting and shaping cup and while the glass below said cup is in suspension therefrom, opening said shear blades and said sections of said cup to permit the temporarily supported glass to sag downwardly by gravity and as augmented by oncoming glass from said outlet, and repeating the operations of closing and subsequently opening said sectional open-bottomed cup and said shears to obtain a series of preshaped similar mold charges.

GEORGE E. ROWE.